(12) United States Patent
Begen et al.

(10) Patent No.: US 8,819,714 B2
(45) Date of Patent: Aug. 26, 2014

(54) RATINGS AND QUALITY MEASUREMENTS FOR DIGITAL BROADCAST VIEWERS

(75) Inventors: Ali C. Begen, London (CA); William C. Ver Steeg, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 12/782,777

(22) Filed: May 19, 2010

(65) Prior Publication Data

US 2011/0289538 A1    Nov. 24, 2011

(51) Int. Cl.
  *H04H 60/32* (2008.01)
  *H04N 21/442* (2011.01)
  *H04H 60/33* (2008.01)

(52) U.S. Cl.
  CPC ......... *H04N 21/44222* (2013.01); *H04H 60/33* (2013.01)
  USPC ............................................. 725/14; 725/107

(58) Field of Classification Search
  CPC .................... H04N 21/44222; H04H 60/33
  USPC ............................................. 725/20, 107, 14
  See application file for complete search history.

(56) References Cited

U.S. PATENT DOCUMENTS

| | | |
|---|---|---|
| 4,788,656 A | 11/1988 | Sternberger |
| 4,907,277 A | 3/1990 | Callens et al. |
| 4,996,663 A | 2/1991 | Nemes |
| 5,414,704 A | 5/1995 | Spinney |
| 5,450,449 A | 9/1995 | Kroon |
| 5,617,421 A | 4/1997 | Chin et al. |
| 5,699,478 A | 12/1997 | Nahumi |
| 5,699,485 A | 12/1997 | Shoham |
| 5,806,086 A | 9/1998 | Kimmel et al. |
| 5,842,040 A | 11/1998 | Hughes et al. |
| 5,884,010 A | 3/1999 | Chen et al. |
| 5,898,837 A | 4/1999 | Guttman et al. |
| 5,943,347 A | 8/1999 | Shepard |
| 5,946,302 A | 8/1999 | Waclawsky et al. |
| 5,956,721 A | 9/1999 | Douceur et al. |
| 5,995,488 A | 11/1999 | Kalkunte et al. |
| 5,995,971 A | 11/1999 | Douceur et al. |
| 6,104,696 A | 8/2000 | Kadambi |

(Continued)

OTHER PUBLICATIONS

Schulzrinne et al, RTP: A Transport Protocol for Real-Time Applications, Jul. 2003, The Internet Society Network Working Group, pp. 1-104.*

(Continued)

*Primary Examiner* — Nasser Goodarzi
*Assistant Examiner* — Michael B Pierorazio
(74) *Attorney, Agent, or Firm* — Merchant & Gould

(57) ABSTRACT

In one system embodiment, a first receive-and-process (RP) system and a second RP system, the first and second RP systems each configured to receive a first broadcast stream corresponding to a service, the broadcast stream comprising either a raw Internet protocol (IP) stream or a non-IP stream, and each further configured to derive a first Real-time Transport Protocol (RTP) stream and a second RTP stream, respectively, based on the first broadcast stream, the first and second RTP streams having stream parameters in common, the first and second RP systems each further configured to provide respective first and second RTP Control Protocol (RTCP) reports, the first and second RTCP reports based on the derived first and second RTP streams, the first and second RTCP reports each comprising information associated with a viewer experience, the respective information having a common benchmark as a basis for comparison.

20 Claims, 10 Drawing Sheets

(56) References Cited

U.S. PATENT DOCUMENTS

| | | | |
|---|---|---|---|
| 6,185,208 B1 | 2/2001 | Liao | |
| 6,275,861 B1 | 8/2001 | Chaudri et al. | |
| 6,341,130 B1 | 1/2002 | Lakshman et al. | |
| 6,356,545 B1 | 3/2002 | Vargo et al. | |
| 6,389,006 B1 | 5/2002 | Bialik | |
| 6,421,802 B1 | 7/2002 | Schildbach et al. | |
| 6,434,153 B1 | 8/2002 | Yazaki et al. | |
| 6,438,695 B1 | 8/2002 | Maufer | |
| 6,507,562 B1 | 1/2003 | Kadansky et al. | |
| 6,542,508 B1 | 4/2003 | Lin | |
| 6,587,985 B1 | 7/2003 | Fukushima et al. | |
| 6,590,894 B1 | 7/2003 | Kerr et al. | |
| 6,611,502 B1 | 8/2003 | Seaman | |
| 6,629,141 B2 | 9/2003 | Elzur et al. | |
| 6,658,000 B1 | 12/2003 | Raciborski et al. | |
| 6,665,637 B2 | 12/2003 | Bruhn | |
| 6,671,722 B1 | 12/2003 | Stachura et al. | |
| 6,687,360 B2 | 2/2004 | Kung et al. | |
| 6,738,353 B2* | 5/2004 | Chong | 370/241 |
| 6,741,600 B1 | 5/2004 | Weiss et al. | |
| 6,757,654 B1 | 6/2004 | Westerlund et al. | |
| 6,760,309 B1 | 7/2004 | Rochberger et al. | |
| 6,801,496 B1 | 10/2004 | Saleh et al. | |
| 6,801,525 B1 | 10/2004 | Bodnar et al. | |
| 6,847,928 B1 | 1/2005 | Naka | |
| 6,854,117 B1 | 2/2005 | Roberts | |
| 6,928,482 B1 | 8/2005 | Ben-Nun et al. | |
| 7,003,790 B1* | 2/2006 | Inoue et al. | 725/10 |
| 7,010,611 B1 | 3/2006 | Wiryaman et al. | |
| 7,036,049 B2 | 4/2006 | Ali et al. | |
| 7,055,174 B1 | 5/2006 | Cope et al. | |
| 7,062,689 B2 | 6/2006 | Slobodnik | |
| 7,139,242 B2 | 11/2006 | Bays | |
| 7,154,855 B2 | 12/2006 | Hardy | |
| 7,206,385 B2 | 4/2007 | Ethier et al. | |
| 7,248,682 B1 | 7/2007 | Oran | |
| 7,260,823 B2* | 8/2007 | Schlack et al. | 725/9 |
| 7,269,157 B2 | 9/2007 | Klinker et al. | |
| 7,286,467 B1 | 10/2007 | Sylvain | |
| 7,305,464 B2 | 12/2007 | Philipi et al. | |
| 7,324,499 B1 | 1/2008 | Borella et al. | |
| 7,436,830 B2 | 10/2008 | Ben-Nun et al. | |
| 7,454,494 B1 | 11/2008 | Hedayat et al. | |
| 7,483,400 B2 | 1/2009 | Kuusinen et al. | |
| 7,496,044 B1 | 2/2009 | Wing | |
| 7,506,194 B2 | 3/2009 | Appanna et al. | |
| 7,515,525 B2 | 4/2009 | Appanna et al. | |
| 7,607,148 B2* | 10/2009 | Feinberg et al. | 725/22 |
| 7,633,879 B2 | 12/2009 | Ramalho | |
| 7,647,604 B2* | 1/2010 | Ramaswamy | 725/9 |
| 7,647,616 B2* | 1/2010 | Puthiyedath | 725/107 |
| 7,675,901 B2 | 3/2010 | Wang et al. | |
| 7,712,114 B2* | 5/2010 | Ramaswamy | 725/14 |
| 7,751,311 B2 | 7/2010 | Ramaiah et al. | |
| 7,788,684 B2* | 8/2010 | Petrovic et al. | 725/18 |
| 7,797,721 B2* | 9/2010 | Greene et al. | 725/107 |
| 7,835,406 B2* | 11/2010 | Oran et al. | 370/522 |
| 7,885,195 B2* | 2/2011 | Volpe et al. | 370/244 |
| 7,904,929 B1* | 3/2011 | Jaunin et al. | 725/86 |
| 7,908,632 B2* | 3/2011 | Russell et al. | 725/107 |
| 7,945,924 B2* | 5/2011 | Li et al. | 725/9 |
| 7,966,078 B2* | 6/2011 | Hoffberg et al. | 700/17 |
| 7,991,770 B2* | 8/2011 | Covell et al. | 707/722 |
| 7,992,177 B2* | 8/2011 | Perry et al. | 725/81 |
| 7,995,494 B2* | 8/2011 | Habib et al. | 370/252 |
| 8,009,742 B2* | 8/2011 | Kim et al. | 375/240.28 |
| 8,077,736 B2* | 12/2011 | Yousef | 370/455 |
| 8,301,982 B2 | 10/2012 | Ver Steeg et al. | |
| 2002/0016856 A1 | 2/2002 | Tallegas et al. | |
| 2002/0064273 A1 | 5/2002 | Tomikawa et al. | |
| 2002/0075895 A1 | 6/2002 | Yamaguchi et al. | |
| 2002/0078440 A1* | 6/2002 | Feinberg et al. | 725/9 |
| 2002/0116501 A1 | 8/2002 | Ho et al. | |
| 2002/0129368 A1* | 9/2002 | Schlack et al. | 725/46 |
| 2002/0131425 A1 | 9/2002 | Shalom | |
| 2002/0141392 A1 | 10/2002 | Tezuka et al. | |
| 2002/0150050 A1 | 10/2002 | Nathanson | |
| 2002/0194361 A1 | 12/2002 | Itoh et al. | |
| 2002/0194606 A1 | 12/2002 | Tucker et al. | |
| 2003/0014705 A1 | 1/2003 | Suzuki et al. | |
| 2003/0023710 A1 | 1/2003 | Corlett et al. | |
| 2003/0026241 A1 | 2/2003 | Ono et al. | |
| 2003/0048786 A1 | 3/2003 | Annunzio | |
| 2003/0086425 A1 | 5/2003 | Bearden | |
| 2003/0117959 A1 | 6/2003 | Taranov | |
| 2003/0120789 A1 | 6/2003 | Hepworth | |
| 2003/0198249 A1 | 10/2003 | Klein et al. | |
| 2003/0204617 A1 | 10/2003 | Buchsbaum et al. | |
| 2003/0227917 A1 | 12/2003 | Maher | |
| 2004/0037267 A1 | 2/2004 | Bennett et al. | |
| 2004/0037320 A1 | 2/2004 | Dickson | |
| 2004/0042456 A1 | 3/2004 | Dittmann et al. | |
| 2004/0071135 A1 | 4/2004 | Jimmei et al. | |
| 2004/0073641 A1 | 4/2004 | Minhazuddin et al. | |
| 2004/0095894 A1 | 5/2004 | Eloranta et al. | |
| 2004/0141502 A1 | 7/2004 | Corson et al. | |
| 2004/0179513 A1 | 9/2004 | Smith et al. | |
| 2004/0181599 A1 | 9/2004 | Kreusch | |
| 2004/0185836 A1 | 9/2004 | Pelaez et al. | |
| 2004/0203787 A1 | 10/2004 | Naghian | |
| 2004/0252694 A1 | 12/2004 | Adhikari et al. | |
| 2004/0264433 A1 | 12/2004 | Melpignano | |
| 2005/0102423 A1 | 5/2005 | Pelavin et al. | |
| 2005/0182850 A1 | 8/2005 | Kohno | |
| 2005/0220035 A1 | 10/2005 | Ling et al. | |
| 2005/0232227 A1 | 10/2005 | Jorgenson et al. | |
| 2005/0243733 A1 | 11/2005 | Crawford | |
| 2005/0276276 A1 | 12/2005 | Davis | |
| 2006/0002366 A1 | 1/2006 | Kawaguchi et al. | |
| 2006/0010243 A1 | 1/2006 | DuRee | |
| 2006/0015891 A1* | 1/2006 | Lazzaro et al. | 725/9 |
| 2006/0031445 A1 | 2/2006 | Rajan et al. | |
| 2006/0031510 A1 | 2/2006 | Beck et al. | |
| 2006/0059411 A1 | 3/2006 | Dacosta | |
| 2006/0062200 A1 | 3/2006 | Wang et al. | |
| 2006/0106961 A1 | 5/2006 | Ebata et al. | |
| 2006/0107187 A1 | 5/2006 | Hannuksela | |
| 2006/0114855 A1 | 6/2006 | Zheng | |
| 2006/0143300 A1 | 6/2006 | See et al. | |
| 2006/0182034 A1 | 8/2006 | Klinker et al. | |
| 2006/0221837 A1 | 10/2006 | Gardner et al. | |
| 2006/0221930 A1 | 10/2006 | Sweeney | |
| 2006/0262716 A1 | 11/2006 | Ramaiah et al. | |
| 2006/0280207 A1 | 12/2006 | Guarini et al. | |
| 2007/0036087 A1 | 2/2007 | Kangru | |
| 2007/0115969 A1 | 5/2007 | Isnardi | |
| 2007/0192782 A1* | 8/2007 | Ramaswamy | 725/9 |
| 2007/0192812 A1* | 8/2007 | Pickens et al. | 725/94 |
| 2007/0199052 A1 | 8/2007 | Sankaran | |
| 2007/0230486 A1 | 10/2007 | Zafirov | |
| 2007/0240181 A1* | 10/2007 | Eldering et al. | 725/14 |
| 2007/0271300 A1* | 11/2007 | Ramaswamy | 707/104.1 |
| 2008/0170117 A1 | 7/2008 | Xiao | |
| 2008/0172708 A1* | 7/2008 | Perry et al. | 725/110 |
| 2008/0259924 A1 | 10/2008 | Gooch et al. | |
| 2008/0271104 A1* | 10/2008 | Perry et al. | 725/118 |
| 2008/0271105 A1* | 10/2008 | Perry et al. | 725/118 |
| 2008/0276293 A1* | 11/2008 | Perry et al. | 725/118 |
| 2008/0285452 A1 | 11/2008 | Oran et al. | |
| 2008/0285463 A1 | 11/2008 | Oran | |
| 2008/0317011 A1 | 12/2008 | Datta et al. | |
| 2009/0010158 A1 | 1/2009 | Filsfils et al. | |
| 2009/0013356 A1* | 1/2009 | Doerr et al. | 725/62 |
| 2009/0034426 A1* | 2/2009 | Luft et al. | 370/252 |
| 2009/0041016 A1* | 2/2009 | Bhal | 370/392 |
| 2009/0089842 A1* | 4/2009 | Perry et al. | 725/78 |
| 2009/0119722 A1 | 5/2009 | Ver Steeg et al. | |
| 2009/0150917 A1* | 6/2009 | Huffman et al. | 725/9 |
| 2009/0164655 A1* | 6/2009 | Pettersson et al. | 709/231 |
| 2009/0271835 A1* | 10/2009 | Cernius et al. | 725/107 |
| 2009/0271836 A1* | 10/2009 | Maxson et al. | 725/107 |
| 2009/0328090 A1* | 12/2009 | Randolph et al. | 725/14 |
| 2010/0070987 A1* | 3/2010 | Amento et al. | 725/10 |
| 2010/0131969 A1* | 5/2010 | Tidwell et al. | 725/14 |

(56) References Cited

U.S. PATENT DOCUMENTS

| | | | |
|---|---|---|---|
| 2011/0072148 A1 | 3/2011 | Begen et al. | |
| 2011/0119546 A1 | 5/2011 | Ver Steeg et al. | |
| 2011/0145847 A1* | 6/2011 | Barve et al. | 725/9 |
| 2011/0258654 A1* | 10/2011 | Lee et al. | 725/1 |

OTHER PUBLICATIONS

U.S. Appl. No. 11/764,722, filed Jun. 18, 2007, entitled "Surrogate Stream for Monitoring Real Time Media", Inventors: Oran et al.
Braden, Network Working Group, Requirements for Internet Hosts-Communication Layers, Oct. 1989, pp. 1-90.
Degermark, IP Header Compression, Feb. 1999, RFC 2507, pp. 1-42.
Friedman et al., "RTP Control Protocol Extended Reports (RTCP XR)", RFC 3611, Nov. 2003, pp. 1-56.
Hamzeh et al., "Point-to-Point Tunneling Protocol (PPTP)", RFC 2637, Jul. 1999.
Information Sciences Institute, University of Southern California, Internet Protocol DARPA Internet Program Protocol Specification, Sep. 1981, pp. 1-46.
Information Sciences Institute, University of Southern California, Transmission Control Protocol, DARPA Internet Program Protocol Specification, Sep. 1981, pp. 1-84.
Jonsson, Robust Header Compression (ROHC), A Link-Layer Assisted Profile for IP/UDP/RTP, Jan. 2006, RFC 4362, pp. 1-21.
Lakshman et al, High-Speed Policy-Based Packet Forwarding Using Efficient Multi-Dimensional Range Matching, 1998, ACM SIGCOMM Computer Communication Review, vol. 28 No. 4, 12 pages, Oct. 1998.
Liao et al., "Adaptive recovery techniques for real-time audio streams," IEE INFOCOM 2001, Twentieth Annual Joint Conference of the IEEE Computer and Communications Societies Proceedings, Apr. 22-26, 2001, vol. 2, pp. 815-823.
Rosenberg, An Offer/Answer Model with Session Description Protocol (SDP), Jun. 2002, RFC 3264, pp. 1-26.
Singer and Desineni, "A General Mechanism for RTP Header Extensions", draft-ietf-avt-rtp-hdrext-12txt, Feb. 26, 2007, pp. 1-23.
Song, Kevin, "The ABC's of Network Security", The Certified Security Professional, Certification Magazine, Feb. 2004, 3 pages.
Thompson, Tunneling Multiplexed Compressed RTP (TCRTP), Nov. 2005, RFC 4170, pp. 1-22.
Welch, A Proposed Media Delivery Index (MDI), Apr. 2006, RFC 4445, pp. 1-9.
U.S. Office Action mailed Mar. 26, 2012 in U.S. Appl. No. 12/620,779, 21 pages.

* cited by examiner

RATINGS AND QUALITY MEASUREMENTS FOR DIGITAL BROADCAST VIEWERS

TECHNICAL FIELD

The present disclosure relates generally to broadcast television and monitoring the viewer experience.

BACKGROUND

The recent transition from analog transmission to all digital services in North America has some repercussions in terms of viewer satisfaction. For instance, when noise impacts an analog feed, though annoying, viewers are generally accustomed to the analog artifacts that ensue. In contrast, when errors occur in digital video signals, artifacts (e.g., severe pixilation) are quite jarring to the viewer. However, the introduction of digital services has also benefited the viewer by offering a tremendous amount of programming options and features.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
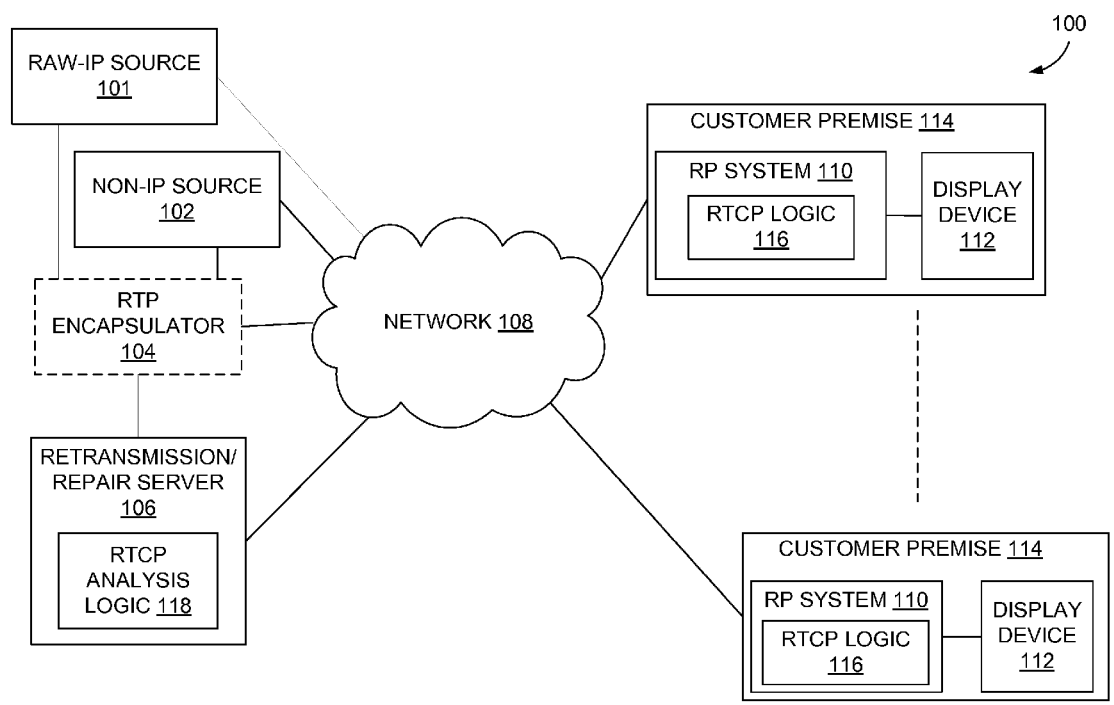
FIG. 1 is a block diagram that illustrates an example environment in which certain embodiments of rating and quality measurement (RQM) systems and methods can be implemented.

In one system embodiment, a first receive-and-process (RP) system; and a second RP system, the first RP system and the second RP system each configured to receive a first broadcast stream corresponding to a service, the broadcast stream comprising either a raw Internet protocol (IP) stream or a non-IP stream, the first and second RP systems each further configured to derive a first Real-time Transport Protocol (RTP) stream and a second RTP stream, respectively, based on the first broadcast stream, the first RTP stream and the second RTP stream having stream parameters in common, the first and second RP systems each further configured to provide a first RTP Control Protocol (RTCP) report and a second RTCP report, respectively, the first RTCP report based on the derived first RTP stream, the second RTCP report based on the derived second RTP stream, the first and second RTCP reports each comprising information associated with a viewer experience, the respective information having a common benchmark as a basis for comparison.

Example Embodiments

Disclosed herein are various example embodiments of rating and quality measurement (RQM) systems and methods (RQM systems and methods are collectively referred to herein also as an RQM system or RQM systems) in a communications environment, such as a subscriber television system, that enable coordinated provision of Real-time Transport Protocol (RTP) Control Protocol (RTCP) feedback reports and communication of the same upstream by one or more client devices that receive digital broadcasts television services delivered over satellite, terrestrial, or cable networks (e.g., terrestrial, satellite, DVB-T, DVB-C, or North American cable, among other networks). For instance, each client device generates valid RTCP reports for the services (e.g., the services received over a particular subscriber network channel) presented to the viewer(s) associated with the client device, and communicates the RTCP reports to an upstream network device (e.g., headend server) associated with a third party (e.g., local service provider). The RTCP reports may be used to facilitate full quality monitoring of broadcast services. In some embodiments, the RTCP reports may be used to collect, aggregate, measure, and/or analyze ratings (e.g., to enable a determination of programming popularity, selective advertisement, etc.). Reference herein to ratings includes, without limitation or exhaustion, user- or device-generated feedback pertaining to whether certain programming content has been presented to a viewer or viewers associated with a client device or client devices, whether the viewer deemed the presentation as favorable or not (e.g., directly through active solicitation, or indirectly via measurement of time, frequency, and/or duration of presentation to the viewer, etc.), and/or viewing patterns (e.g., order of channel changes—indicating from which channel did a viewer change from and/or to which channel a viewer changed from, types of programming viewed and the frequency or duration of viewing, pattern as to the times or days or other time references when programming is viewed—historical viewing patterns, etc.). Further, the RTCP reports are provided in coordinated fashion—such that different client devices receiving the digital broadcast streams similarly reference the same packets of the same channels—enabling the aggregation and comparison (e.g., by a third party) of the information provided in these reports. In other words, if different client devices refer to packets of a given service corresponding to the broadcast stream differently, then aggregation and comparison is rendered meaningless since there is no common benchmark.

In one embodiment of an RQM system, an encapsulating device or system receives an MPEG-2TS source stream (e.g., a national broadcast feed) and maps the packets of the source stream to RTP packets of an RTP stream, and provides a corresponding mapping stream to the client devices. The client devices receive the mapping stream, and derive RTP packets of an RTP stream based on the received mapping stream and a received raw or non-IP broadcast stream. The use of a common mapping stream enables a coordinated RTP packet derivation among the client devices that receive the same mapping stream and the broadcast stream. Based on the locally generated RTP streams, RTCP reports are derived at each client device and communicated to, for instance, a service provider, which aggregates the reports and compares the information found therein for use in determining (and rendering) quality of service and/or ratings of services (e.g., rating a program of a given broadcast channel, such as whether the program was presented to the viewer, the time of presentation, and/or the duration of the presentation to the viewer, etc.).

Explaining further, such an embodiment transmits a non-IP video stream to one or more customer premises, each comprising a client device configured as a receive-and-process (RP) system (herein, client devices and RP systems used interchangeably, with the understanding that the term "client" is used for distinguishing a relative location from the provider of the source stream, and in some embodiments, a client device may be disposed anywhere in a network that enables receipt of the non-IP or raw IP streams) with decoding functionality, the non-IP video stream delivered over a communications network. In addition, the non-IP video stream is also provided to an encapsulator system or device, such as an RTP encapsulator. The RTP encapsulator builds RTP packets (e.g., IP/UDP/RTP/MPEG-2TS encapsulation) from the source stream and also builds a mapping stream, the latter describing which transport stream packets correspond to which RTP packets based on a correlation of identifying information or stream parameters from the RTP headers and the transport layer of, for instance, an MPEG-2TS. The mapping stream is delivered to one or more RP systems over an IP connection or otherwise (e.g., over-the-air, in-band cable, etc.), where the mapping stream is used to enable local, coordinated RTP stream generation and subsequent RTCP reports (as well as facilitate packet-level repair, retransmission, etc.), such as over an IP connection. In some embodiments, a raw IP video stream is transmitted to one or more RP systems and is also RTP-encapsulated to derive a mapping stream, the latter which is transmitted over an IP connection to facilitate benefits related to RTP mechanisms at one or more RP systems.

In some embodiments, the mapping stream is not "pushed" to the RP systems from upstream, but rather, local derivation of the RTP streams is achieved based on locally derived (or provided) one-to-one (1:1) mapping functions that associate stream parameters of the source stream to stream parameters of the derived RTP streams. The RTP streams derived at each RP system may occur with or without communication between other RP systems, as explained further below. In turn, RTCP reports are generated from the RTP streams derived at each RP system and communicated upstream for analysis as similarly explained above.

As should be understood by one having ordinary skill in the art, the generation (e.g., derivation) of RTCP reports is well-known, and based on the provisions of RFC 3550 and RFC 3611, among other RTCP report generation mechanisms based on current and/or future extensions and/or revisions.

Transmission of the broadcast streams described herein occurs via non-Internet Protocol (IP) and raw-IP transport streams (the transport stream comprising one or more of compressed video, audio, and/or data streams, the compression of each according to one of a plurality of video and/or audio coding standards/specification). Although the raw and non-IP transport streams may comprise of coded video, audio, data, alone or in some combination, reference will also be made herein to raw and non-IP transport streams in the context of video streams for purposes of illustration, with the understanding that Moving Picture Experts Group (MPEG)-based (e.g., MPEG-2) transport mechanisms, or other transport mechanisms in some embodiments, are contemplated as the carrier of the compressed video, audio, and/or data.

Reference herein to non-IP video streams includes video streams encoded according to a video coding specification such MPEG-2, AVC, among others, and carried as a transport stream (single program or multiple program) with no User Datagram Protocol (UDP) or Real-time Transport Protocol (RTP) packet formatting. Further, reference to raw-IP video streams includes video streams encoded according to a video coding specification such as MPEG-2, among others, and carried as a transport stream (single program or multiple programs) encapsulated in IP/UDP-only. Additionally, video, audio, and/or data streams are also referred to herein as flows, and MPEG-2TS refers to MPEG-2 transport streams.

Further, the RP systems of one or more RQM system embodiments are configured with logic such as executable code and/or other logic (e.g., referred to herein as RTCP logic) that enables the creation or derivation of RTP streams based, at least in part, on received, or locally-generated, mappings to enable coordinated RTP generation and hence RTCP report provision with a common benchmark for third party analysis.

These and other embodiments and/or other features are described hereinafter in the context of an example subscriber television system environment, with the understanding that other multimedia (e.g., video, graphics, audio, and/or data, or otherwise referred to also herein individually or collectively as media content) environments may also benefit from certain embodiments of the RQM systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a block diagram of an example environment, a subscriber television network 100, in which certain embodiments of RQM systems and/or methods may be implemented. The subscriber television network 100 includes one or more raw IP sources (e.g., IP/UDP/MPEG-2TS) 101 and/or one or more non-IP sources (e.g., MPEG-2TS without IP/UDP encapsulation) 102 communicatively coupled (e.g., via a communications interface that may include a QAM or QPSK modulator, multiplexer, converter, transmitter, among other well-known broadcasting components or logic) to one or more (e.g., represented by the dashed line) customer premises 114 over a communications network 108. Each of the customer premises 114 comprises one or more receive-and-process (RP) systems 110 as explained further below. In one embodiment, the raw-IP source 101 and non-IP source 102 deliver encoded video content (among other media content, such as audio and/or data content) for a single program carried in a single MPEG-2 program stream (e.g., one or more packetized elementary stream (PES) packet streams sharing a common time base), and in other implementations, the encoded visual content for multiple programs may be carried as multiple MPEG-2 programs, each MPEG-2 program associated with its own respective time base. It should be understood that, although MPEG-2 based video encoding and transport is described throughout the disclosure, encoding and transport (collectively coding) according to other video and/or audio specifications and/or standards (including proprietary mechanisms) may similarly benefit from the RQM systems described herein and hence are contemplated to be within the scope of the disclosure.

The subscriber television network 100 further includes one or more encapsulator systems, such as RTP encapsulator 104. As is made clear below, some embodiments of the RQM systems described herein do not use an RTP encapsulator at an upstream location, and hence the RTP encapsulator 104 is shown in "phantom" to represent this feature. The RTP encapsulator 104 comprises logic (hardware, software, or a combination of hardware and software) to convert raw or non-IP video stream packets to RTP packets, create mapping streams, and in some embodiment, optionally create Forward Error Correction (FEC) packets. It is noted preliminarily that the RP systems 110 comprise logic that includes one or more functionality of the RTP encapsulator 104, as explained further below.

The subscriber television network 100 also comprises one or more retransmission/repair servers, such as retransmission/repair (R/R) server 106 communicatively coupled to the RTP encapsulator 104. The R/R server 106 is configured to receive the RTP encapsulated streams generated by the encapsulator 104, and further comprises logic (e.g., software, hardware, or a combination of both) that provides retransmitted packets (e.g., RTP-encapsulated) responsive to retransmission requests from the customer premises 114, processes RTCP reports from the customer premises 114 (e.g., via RTCP analysis logic 118), and/or provides rapid channel changing functionality. In some embodiments, the R/R server 106 receives RTP-encapsulated FEC packets from the encapsulator 104 for delivery to plural customer premises 114, while some system embodiments may rely on transmission of RTP-encapsulated FEC packets directly from the encapsulator 104. In one embodiment, the raw-IP source 101, non-IP source 102, RTP encapsulator 104, and R/R server 106 are coupled to one another via a local area network (e.g., an Ethernet network).

In one embodiment, the raw-IP source 101 and non-IP source 102 may reside in a service provider facility located upstream of a headend, and the RTP encapsulator 104 and R/R server 106 may reside in the headend (or a downstream hub or node). In some embodiments, as mentioned above, the raw-IP source 101, non-IP source 102, RTP encapsulator 104, and R/R server 106 may be co-located (e.g., in a headend). In some embodiments, one or more of the various functionality of the RTP encapsulator 104 may reside in other devices, such as in the R/R server 106, the raw-IP source 101, the non-IP source 102, among other devices (e.g., such as residing within a gateway at the network edge, within a customer premise 114, or elsewhere in the network).

The customer premises 114 each comprises one or more RP systems 110, as indicated above, and one or more display devices, such as display device 112. The display device 112 is coupled to, or in some embodiments, integrated with, the RP system 110. In one implementation, the display device 112 is configured with an audio component (e.g., speakers), whereas in some implementations, audio functionality may be provided by a device that is separate from, yet communicatively coupled to, the display device 112 and/or RP system 110. The RP system 110 further includes RTCP logic 116, which includes functionality to process and/or create mapping streams, build or derive RTP packets (e.g., based on received, or locally generated, mapping streams and the received raw or non-IP streams), and generate RTCP reports that may be correlated. The RP system 110 (also referred to herein as a client device, digital receiver, receiver, or processing device) may comprise one of many devices or a combination of devices, such as a set-top box, television with communication capabilities, cellular phone, personal digital assistant (PDA), or other computer or computer-based device or system, such as a laptop, personal computer, DVD and/or CD recorder, among others.

The communications network 108 comprises a one-way network or, in some embodiments, a bi-directional network, and may include a cable television network, a satellite television network, a terrestrial network, an IP network, or a combination of two or more of these networks or other networks. Further, network PVR and switched digital video are also considered within the scope of the disclosure. Generally, the communications network 108 may comprise a single network, or a combination of networks (e.g., local and/or wide area networks). For instance, the communications network 108 may comprise a wired connection or wireless connection (e.g., satellite, wireless LAN, etc.), or a combination of both. In the case of wired implementations, communications network 108 may comprise a hybrid-fiber coaxial (HFC) medium, coaxial, optical, twisted pair, etc. Other networks are contemplated to be within the scope of the disclosure, including networks that use packets incorporated with and/or compliant to other transport protocols or standards or specifications.

Although described in the context of video processing, it should be understood that certain embodiments of the RQM systems described herein also include functionality for the processing of other media content such as compressed or uncompressed audio streams, data streams, and/or graphics or image streams.

The subscriber television network 100 (or components thereof) may comprise one or more other servers, routers, and/or switches at one or more locations of the network 100 that process and deliver and/or forward (e.g., route) various digital services to subscribers. Such digital services may include broadcast television programming, video-on-demand (VoD), pay-per-view, music, Internet access, e-commerce (e.g., online shopping), voice-over-IP (VoIP), and/or other telephone or data services. In one embodiment, an RQM system comprises components distributed throughout the subscriber television network 100 (e.g., a headend component and one or more of the RP systems 110), and in some embodiments, an RQM system comprises a single components of the subscriber television network 100 (e.g., the RP system 110, or portions thereof).

In some embodiments, the subscriber television network 100 (or components thereof) may further comprise additional components, such as QAM and/or QPSK modulators, routers, bridges, Internet Service Provider (ISP) facility servers, private servers, on-demand servers, additional channel change servers (e.g., additional to the R/R server 106), multimedia messaging servers, program guide servers, gateways, multiplexers, and/or transmitters, among other equipment, components, and/or devices well-known to those having ordinary skill in the art.

Figure 2:
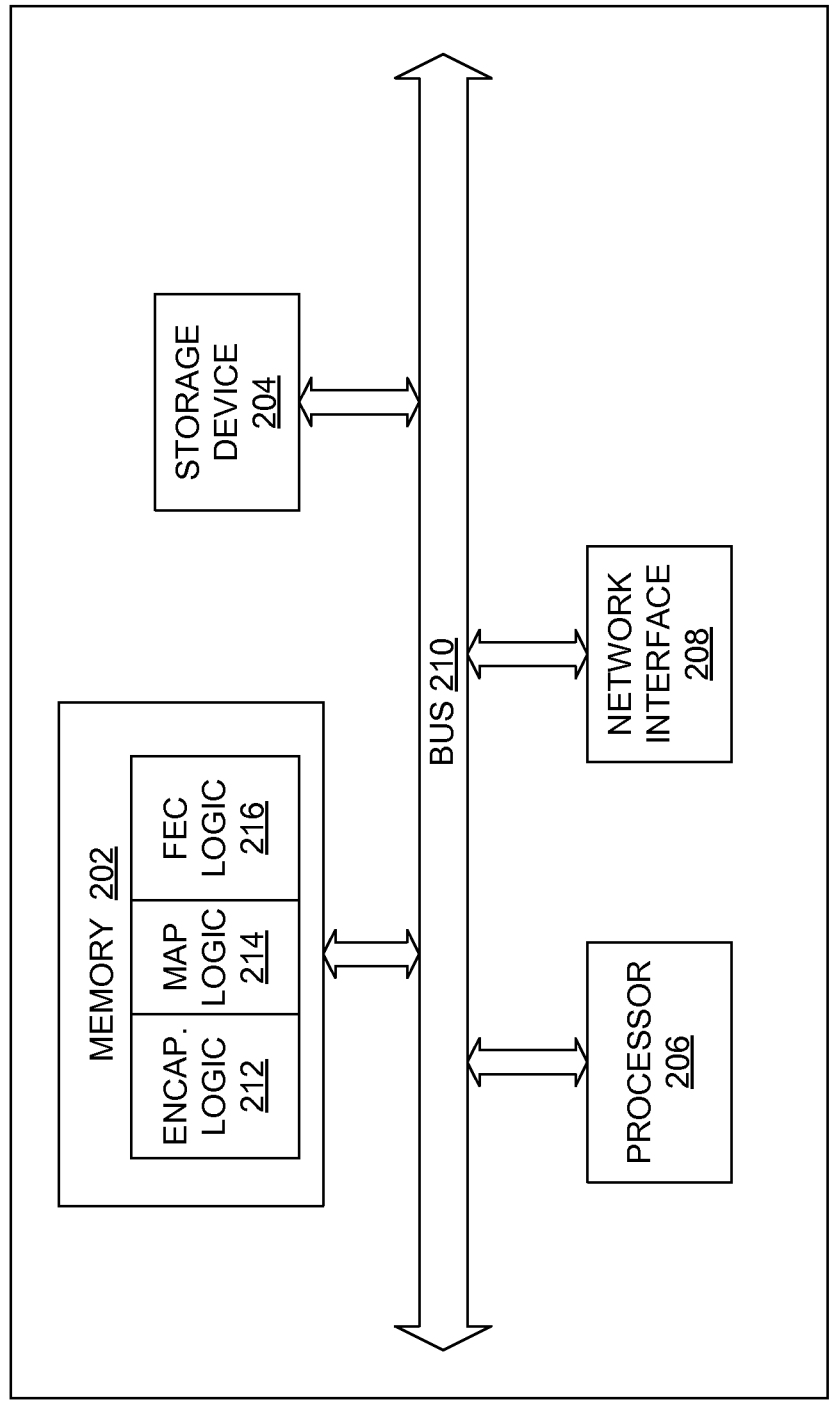
FIG. 2 is a block diagram that illustrates an embodiment of an example Real-time Transport Protocol (RTP) encapsulator system of an example RQM system.

FIG. 2 is a block diagram that illustrates an embodiment of an example RTP encapsulator 104. It should be understood by one having ordinary skill in the art, in the context of the present disclosure, that the RTP encapsulator 104 shown in FIG. 2 is merely illustrative, and should not be construed as implying any limitations upon the scope of the disclosure. The RTP encapsulator 104 comprises a memory 202 (e.g., a tangible medium such as random access memory (RAM), read-only memory (ROM), etc.) encoded with various instructions or executable code, an optional storage device 204 (e.g., CD, DVD, etc.), a processor 206 (e.g., microcontroller, microprocessor, digital signal processor, etc.), and a network interface 208 configured to enable the reception of raw or non-IP video streams, among other data, and to enable the communication of a mapping stream to the customer premises 114, R/R server 106, or local storage, FEC packets (e.g., RTP-encapsulated) to the customer premises 114 or in some embodiments (e.g., multicast of FEC packets) to the R/R server 106, and RTP-encapsulated MPEG streams to the R/R server 106.

The memory 202, storage device 204, processor 206, and network interface 208 are coupled over a bus 210. In one embodiment, the memory 202 comprises RTP encapsulation logic (encap. logic) 212, mapping logic (map logic) 214, and FEC logic 216. The encapsulation logic 212 is configured to RTP encapsulate the raw or non-IP video streams received from the raw-IP source 101 and non-IP source 102, respectively. The mapping logic 214 is configured to build a mapping stream that correlates the RTP encapsulated raw or non-IP video streams with the received raw or non-IP video streams, respectively. In some embodiments, the mapping logic 214 may be further configured to provide for the compression of the mapping stream (or in some embodiments, compression logic may be a separate logic module), as explained further below. The FEC logic 216 is configured to provide for Forward Error Correction. One or more of the above-mentioned software logic (e.g., 212, 214, and/or 216) may be combined with each other as a single module in some embodiments, or distributed among different devices in some embodiments. Further, functionality of one or more of the above-mentioned software logic may be incorporated in the RTCP logic 116, as explained below. Note that the above-mentioned software logic (e.g., 212, 214, and/or 216) is also collectively referred to herein as encapsulation logic. The RTP encapsulation logic 212, mapping logic 214, and FEC logic 216 comprise instructions that, when executed by the processor 206, cause the processor 206 to perform the various functions of the RTP encapsulator 104. In some embodiments, functionality of one or more of the RTP encapsulation logic 212, mapping logic 214, and FEC logic 216 may be implemented at least in part via fixed or programmable logic, such as an integrated circuit or field programmable gate array (FPGA), among others.

Figure 3:
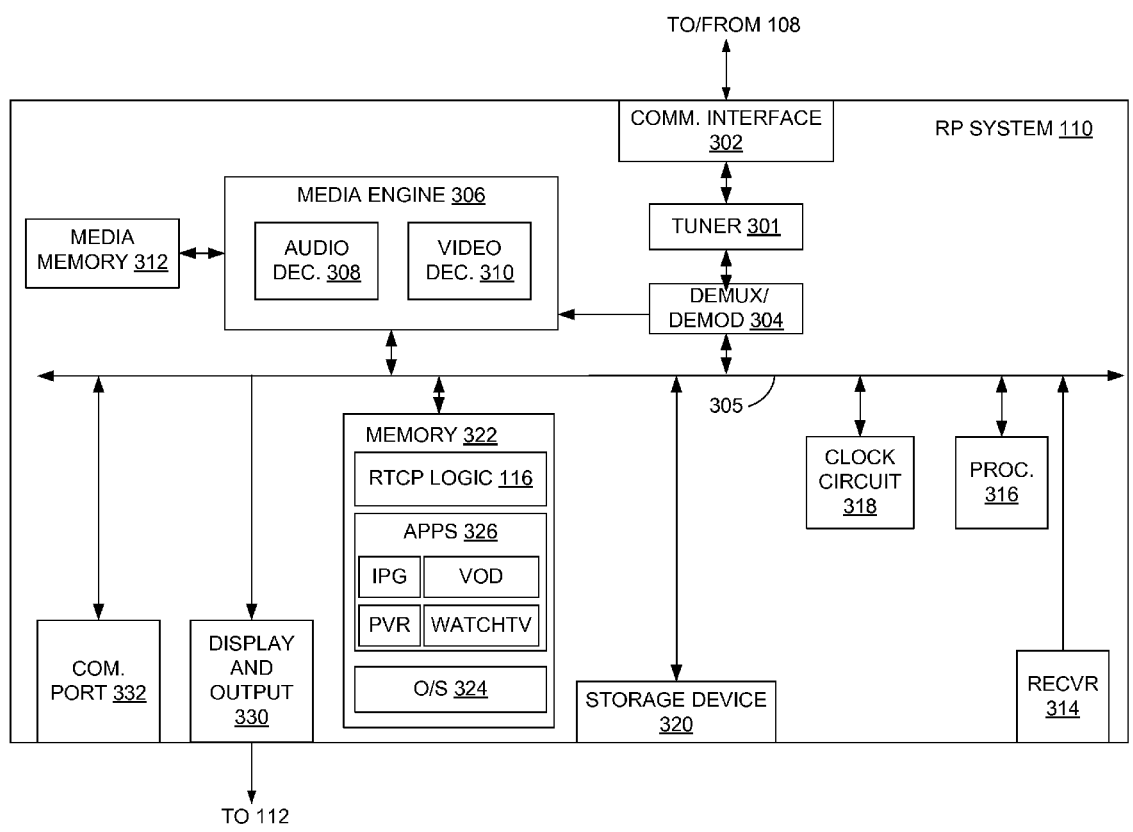
FIG. 3 is a block diagram that illustrates an embodiment of an example receive-and-process (RP) system of an example RQM system.

FIG. 3 is a block diagram that illustrates an embodiment of an example RP system 110. It should be understood by one having ordinary skill in the art, in the context of the present disclosure, that the RP system 110 shown in FIG. 3 is merely illustrative, and should not be construed as implying any limitations upon the scope of the disclosure. The RP system 110 includes a communication interface 302 (e.g., depending on the implementation, suitable for enabling communication functionality for raw IP and non-IP video streams, an IP network, a coaxial cable network, an HFC network, wireless network, etc.) coupled to a tuner system 301 (e.g., radio frequency tuning), which comprises one or more tuners for receiving the raw-IP and non-IP video streams received via the communication interface 302. The tuning system 301 is coupled to a demultiplexer/demodulator 304 (hereinafter, referred to also as a demux 304). Note that in some embodiments, the tuner system 301 and demux 304 are omitted. The demux 304 is configured to demodulate the received carrier signal and parse raw or non-IP transport stream packets of one or more defined carrier frequencies to identify and extract information in the video stream (e.g., transport stream) to facilitate the identification, extraction, and processing of the compressed pictures. Such information, also referred to as stream parameters, may include Program Specific Information (PSI) (e.g., Program Map Table (PMT), Program Association Table (PAT), etc.) and other parameters or syntactic elements (e.g., Program Clock Reference (PCR), timestamp information, payload_unit_start_indicator, etc.) of the transport stream (including packetized elementary stream (PES) packet information). Such information, which includes identifying information such as PCR, payload_unit_start_indicator, continuity counter, etc., is forwarded to or otherwise received by the RTCP logic 116 and/or media engine 306 as explained further below. In one embodiment, the demux 304 is configured with programmable hardware (e.g., PES packet filters). In some embodiments, the demux 304 is configured in software, or a combination of hardware and software.

The demux 304 is coupled to a bus 305 and to a media engine 306 (also known as an audio/video (a/v) processing or decoding device). The media engine 306 comprises, in one embodiment, decoding logic comprising one or more of a respective audio decoder 308 and video decoder 310. Though shown as a software module in memory 322, the RTCP logic 116 may reside in the media engine 306 or elsewhere in the RP system 110. The media engine 306 is further coupled to the bus 305 and to media memory 312, which in one embodiment comprises one or more buffers for temporarily storing compressed and/or reconstructed pictures. In some embodiments, the buffers of the media memory 312 may reside in other memory (e.g., memory 322, explained below).

The RP system 110 further comprises additional components coupled to bus 305. For instance, RP system 110 further comprises a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 316 for controlling operations of the RP system 110, and a clock circuit 318 comprising phase and/or frequency locked-loop circuitry to lock into system clock information (e.g., program clock reference, or PCR, which may be used to reconstruct the system time clock (STC) at the RP system 110) received in the video stream (e.g., adaptation field of the transport stream) to facilitate decoding operations and to clock the output of reconstructed audiovisual content. For instance, PTS/DTS values received in a transport stream are compared to the reconstructed STC (generated by the clock circuit 318) to enable a determination of when the buffered compressed pictures are provided to the video decoder 310 for decoding (DTS) and when the buffered, decoded pictures are output by the video decoder 310 (PTS) to display and output logic 330 for processing and subsequent presentation on a display device 112. In some embodiments, clock circuit 318 may comprise plural (e.g., independent or dependent) circuits for respective video and audio decoding operations. Although described in the context of hardware circuitry, some embodiments of the clock circuit 318 may be configured as software (e.g., virtual clocks) or a combination of hardware and software. Further, in some embodiments, the clock circuit 318 is programmable.

The RP system 110 further comprises, in one embodiment, a storage device 320 (and associated control logic) to temporarily store buffered content and/or to more permanently store recorded content. Memory 322 in the RP system 110 comprises volatile and/or non-volatile memory, and is configured to store executable instructions or code associated with an operating system 324, and one or more applications 326 (e.g., interactive programming guide (IPG), video-on-demand (VoD), personal video recording (PVR), WatchTV (associated with broadcast network TV), among other applications such as pay-per-view, music, driver software, etc.).

Further included in one embodiment of memory 322 is RTCP logic 116, referred to previously, and which in one embodiment is configured in software. In some embodiments, RTCP logic 116 may be configured in hardware, or a combination of hardware and software. The RTCP logic 116, which operates in cooperation with other components of the RP system 110, such as with the decoding logic of the media engine 306, is responsible for processing mapping streams received from upstream of the RP system 110 (or locally generating mapping streams based on received header information in the non-IP or raw IP streams), building RTP stream packets (using encapsulation logic) based on the mapping streams, optionally communicating the manner of generating or deriving the RTP stream packets to other RP systems 110 and handling feedback from those RP systems 110, detecting and/or identifying missing or corrupted transport packets, processing FEC packets to recover missing or corrupted packets, requesting retransmission and processing the retransmission, re-ordering of retransmission packets, and generating and facilitating the delivery of RTCP reports. In short, one embodiment of the RTCP logic 116 comprises code that enables RQM functionality.

The RP system 110 is further configured with the display and output logic 330, as indicated above, which includes graphics and video processing pipelines as known in the art to process the decoded pictures and provide for presentation (e.g., display) on display device 112. A communications port 332 (or ports) is further included in the RP system 110 for receiving information from and transmitting information to other devices, such as the communications between the RP system 110 and other RP systems 110 during RTP stream derivation. For instance, the communication port 332 may feature USB (Universal Serial Bus), Ethernet, IEEE-1394, serial, and/or parallel ports, etc. In addition, communications port 332 may be configured for home networks (e.g., HPNA/MoCA, etc.), enabling RQM functionality to be employed for networks local to the RP system 110. The RP system 110 may also include an analog video input port for receiving analog video signals.

One having ordinary skill in the art should understand in the context of the present disclosure that the RP system 110 may include other components not shown, including a compression engine, memory, decryptors, samplers, digitizers (e.g., analog-to-digital converters), multiplexers, conditional access processor and/or application software, driver software, Internet browser, among others. Further, though the RTCP logic 116 is illustrated as residing in memory 322, it should be understood that such logic 116 may be incorporated in the media engine 306 in some embodiments, or elsewhere. Similarly, in some embodiments, functionality for one or more of the components illustrated in, or described in association with, FIG. 3 may be combined with another component into a single integrated component or device.

Figure 4A:
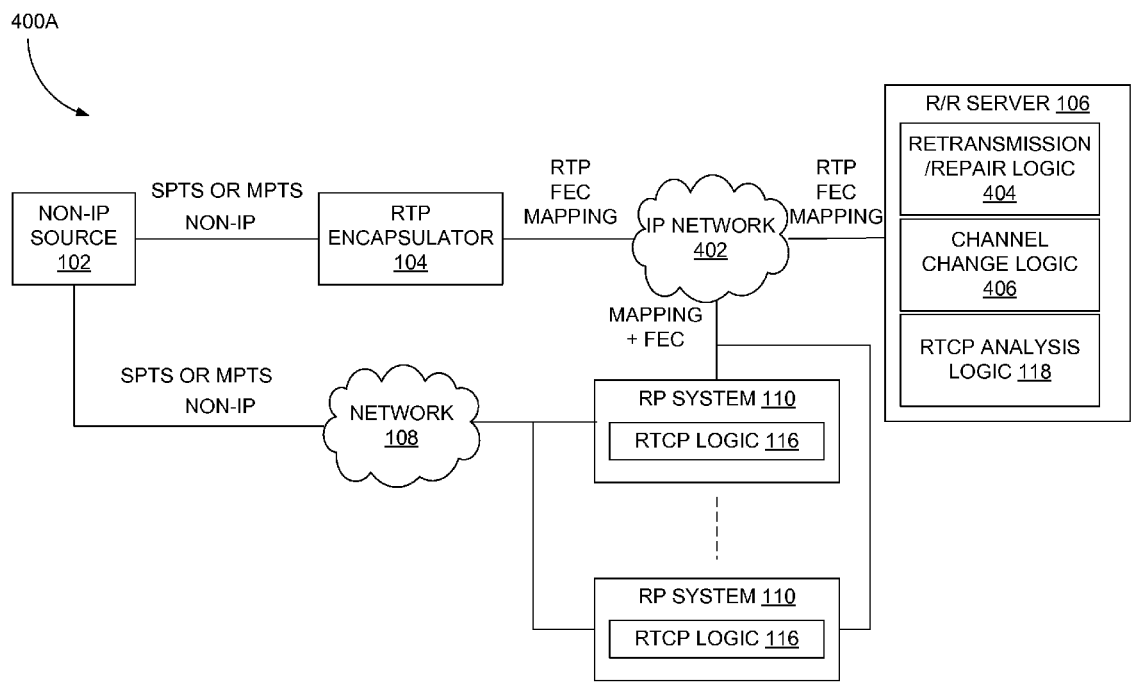
FIG. 4A is a block diagram that illustrates an embodiment of an example RQM system that processes non-Internet Protocol (IP), Moving Picture Experts Group (MPEG) transport streams and provides RTP Control Protocol (RTCP) reports based on a mapping stream provided by an RTP encapsulator system.
Figure 4B:
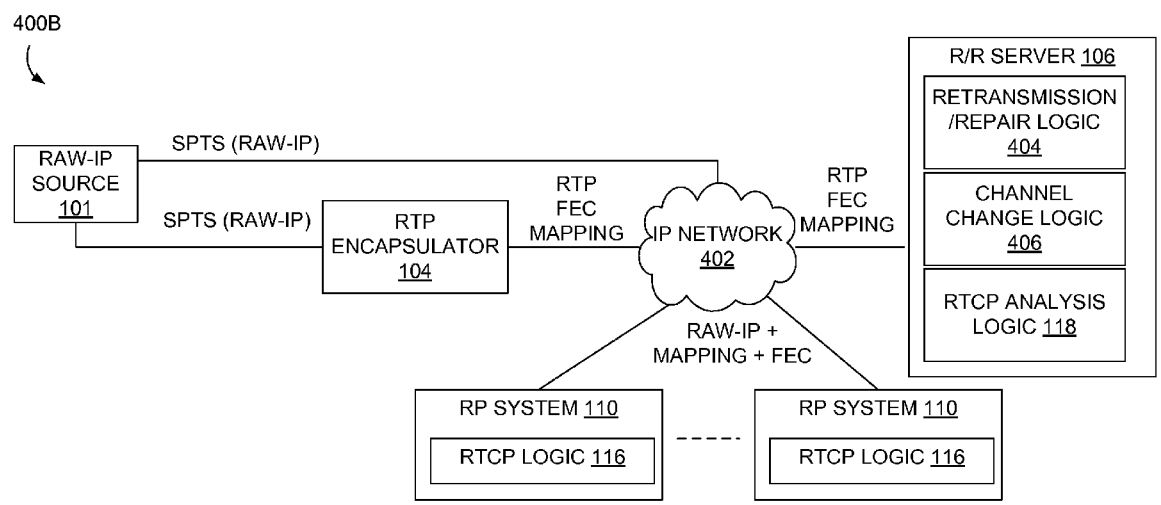
FIG. 4B is a block diagram that illustrates an embodiment of an example RQM system that processes raw-IP, MPEG transport streams and provides RTCP reports based on a mapping stream provided by an RTP encapsulator system.

Having described various components of one or more embodiments of an RQM system, attention is directed to the block diagrams of FIGS. 4A-4B, which include one or more of the components illustrated in FIGS. 1-3 to illustrate certain embodiments that derive coordinated RTP streams from a mapping stream delivered from the encapsulator 104 or R/R server 106. Referring to FIG. 4A, shown is one RQM system embodiment 400 that includes the non-IP source 102 providing a single program transport stream (SPTS) or multiple program transport stream (MPTS), non-IP video stream (comprising MPEG-2TS packets), such as corresponding to a broadcast television program, to the RTP encapsulator 104, and to the one or more RP systems 110 via the communications network 108. The dashed line interposed between the two RP systems 110 shown in FIG. 4A represent that many RP systems 110 may be incorporated into the network. The RTP encapsulator 104, and in particular the RTP encapsulation logic 212 (FIG. 2) applies IP/UDP/RTP encapsulation to the received non-IP video stream, and provides the RTP-encapsulated MPEG flows to the R/R server 106 via the IP network 402. The mapping logic 214 (FIG. 2) of the encapsulator 104 generates a mapping stream based on the encapsulation. The mapping stream comprises a mapping of each MPEG-2TS 188-byte cell into the corresponding RTP packet, enabling each cell to be unambiguously referenced when deriving a corresponding RTP stream at each RP system 110 that receives the transport stream. The RTP encapsulator 104 provides the mapping stream to the RP system 110 via the IP network 402, or in some embodiments, using other mechanisms such as in-band or over-the-air mechanisms.

The FEC logic 216 (FIG. 2) of the encapsulator 104 may build RTP-encapsulated FEC packets corresponding to the non-IP video stream. The mapping stream (e.g., in the form of a data structure as described below) and optionally the FEC packets are provided over an IP network 402 to the one or more RP systems 110. In some embodiments, the mapping stream and/or the FEC packets may be communicated to the R/R server 106 (or logic, such as retransmission/repair logic 404 therein, may create the FEC packets in some embodiments), and from the R/R server 106 the mapping and/or FEC packets may be communicated to the RP system 110 via the IP network 402.

The R/R server 106 is configured to receive the mapping stream (in some embodiments) and/or the RTP-encapsulated MPEG stream from the RTP encapsulator 104. The R/R server 106 is further configured with retransmission/repair logic 404 and channel change logic 406 that, responsive to a retransmission request or channel change request, respectively, provides a respective retransmission of repair packets (e.g., RTP-encapsulated) or unicast stream corresponding to content of the changed-to channel over the IP network 402 to the RP system 110. In one embodiment, the R/R server 106 further comprises RTCP analysis logic 118 that receives RTCP reports from plural RP systems 110 in the subscriber television network 100 and aggregates, compares, and renders for output on a display device or storage (e.g., for later retrieval) viewer experience information provided in the RTCP reports, such as quality or rating-related information. In some embodiments, the aforementioned analysis of the RTCP reports may be implemented elsewhere, such as at the stream source or other upstream (e.g., relative to the customer premises 104) devices. The IP network 402 in some embodiments may be part of the communications network 108, and may be considered an out-of-band channel or generally a low-speed link. In some embodiments, the IP network 402 may be separate from the communications network 108.

In one embodiment, when the encapsulation logic 212 builds the RTP packets out of the raw MPEG-2TS packets, the mapping logic 214 (in cooperation with the encapsulation logic 212 or in some embodiments, the functionality of each may be combined in a single module) generates a mapping stream that describes which MPEG-2TS cell (e.g., using transport-level identifying information, such as PID and modulo 7 continuity counter) goes into which RTP packet. In one embodiment, primary correlating elements or identifying information comprises timestamp information (e.g., PTS), the program clock reference (PCR), the payload_unit_start_indicator, and the PIDs and corresponding continuity counters. For SPTS flows that follow RFC 2250 (e.g., RTP encapsulation of MPEG-2TS flows) and use the 90 kHz portion of the encoder PCR clock as the RTP timestamp, a two-phased approach (general-to-specific) may be implemented in which the general area of the correlation can be identified using the clocks, and then the pattern of the PID and continuity counter may be used to precisely map from the raw flows to the RTP encapsulated flows. The mapping logic 214 concatenates each of these record streams (comprising identifying information corresponding to the non-IP and RTP-encapsulated non-IP stream) together and optionally compresses these record streams together using one or more of a plurality of compression algorithms. The mapping logic 214 then delivers (or causes to be delivered) the mapping stream (e.g., via multicast, though not limited to multicast) to the customer premises 114.

The RP systems 110 receive the non-IP video streams (e.g., MPEG-2TS flow), and based on identifying information (e.g., parameters such as PID, continuity counter) of each received cell in the received non-IP video stream, synchronizes the in-band non-IP video stream with the out-of-band RTP mappings. For one or more cells lost in the in-band flow, the media engine 306 and RTCP logic 116 of the RP system 110 can repair the lost cell based on knowledge of the RTP sequence numbers of the corresponding RTP packet derived from the mapping stream using the FEC packets and/or the re-transmission capabilities of the out-of-band link. The RP system 110 (e.g., RTCP logic 116 in cooperation with decoding logic of the media engine 306) is further configured to identify mis-ordered packets and locally re-order them based on the mappings.

A data structure for the mapping stream is provided by the mapping logic 214, and may include (e.g., on a per-RTP encapsulated packet basis) all or a subset of parameters such as RTP sequence number, RTP timestamp, length of the RTP header, entire RTP header, number of cells and corresponding identifier of the cells. The mapping logic 214 builds the data structure as the encapsulation logic 212 encapsulates the MPEG-2TS (MPTS or SPTS) packets into IP/UDP/RTP packets, and in one embodiment, sends the mapping to the RTCP logic 116. Note that additional or different identifying information (e.g., from that enumerated as an example above) may be used to, for instance, aid in synchronization, such as the addition of the payload_unit_start_indicator. Further note that the dotted lines between the continuity counter of the first cell and the PID of the nth cell are used to symbolize or represent the possibility of multiple PID and continuity counters (or other identifying information) for respective cells. When the RTCP logic 116 and decoding logic of the media engine 306 receive this identifying information along with the good MPEG-2TS stream, the RTCP logic 116 can synchronize the MPEG-2TS flow with the corresponding RTP flow built upstream.

The transmission and subsequent reception of all or a portion of the full header enables the RTCP logic 116 to build the entire RTP stream, hence enabling the derivation of RTCP reports. When the RTCP logic 116 (in cooperation with the decoding logic of the media engine 306) detects a discontinuity, the RTP sequence number of the start of the outage is also discernible. When data reception resumes (e.g., after the outage is over), the RTCP logic 116 can determine the RTP sequence number of the data received after the dropped data, and apply either FEC or request retransmission to recover the missing packet(s) (via recovering the missing cell(s) out of the RTP packet(s) from the R/R server 106).

The derived RTCP reports comprising information (e.g., viewer experience information, such as quality monitoring information for one or more services processed at one or more RP systems 110 and/or ratings information) are communicated by the RP systems 110 to the R/R server 106 or other upstream network devices for aggregation, comparison, and/or other processing (e.g., by the RTCP analysis logic 118 or like-functionality when located elsewhere).

It should be understood by one having ordinary skill in the art, in the context of the present disclosure, that the above data structure is one illustrative example among many of an example mapping stream, and that other data structures may be employed in some embodiments and hence are contemplated to be within the scope of the present disclosure.

The mapping stream can optionally be compressed (e.g., via compression logic integrated with the mapping logic 214 or separate from the mapping logic in some embodiments, as explained above) according to one or mechanisms by noting the structure of the typical data. For instance, the RTP sequence numbers typically increment monotonically. In one example form of compression, the RTP timestamp may be represented as a base time and a time delta. Several observations facilitate this form of compression, including the observation that there exists a very small number of PID values per SPTS, and a well-bounded number of PID values per MPTS. Further, the PID values tend to cluster, with video as the dominant PID. Based on these observations, a stateful compression algorithm may be instantiated at session establishment. The session establishment instantiates (e.g., via two-way handshake or periodic status packets) a base RTP sequence number, base RTP timestamp, and an enumerated list of PIDs. In other words, the baseline compression algorithm uses an offset from the RTP sequence number, an offset from the baseline RTP timestamp, and an enumerated type rather than the actual PID.

Further compression is possible by noting that there are often long runs of sequential video-only cells. These runs may be compressed using a form of Run Length Encoding (RLE). For example, the notation "PID N for M cells with incrementing CC" may be easily encoded. If the information of the packet was not compressible (e.g., a "strange PID"), it may be sent uncompressed.

FIG. 4B is a block diagram that illustrates another RQM system embodiment 400B. It should be appreciated that like-numbered components to those shown in FIG. 4A comprise the same architecture and functionality, and hence discussion of the same is omitted except where helpful to the below-description. The RQM system 400B includes the raw-IP source 101 delivering raw-IP (e.g., IP/UDP/MPEG) SPTS flows to both the IP network 402 and to the RTP encapsulator 104. The RTP encapsulator 104 RTP-encapsulates the raw-IP video flow and builds FEC packets. Further, the RTP encapsulator 104 builds the mapping (e.g., a table, though not limited to a table data structure) of cell-to-RTP packets, as described above. With UDP packets as an input to the RTP encapsulator 104, mapping is simplified (relative to mapping for MPEG-2TS to RTP conversion as described in association with FIG. 4A) since one UDP packet is typically encapsulated into a single RTP packet. However, knowledge or information is still used as to which UDP packet corresponds to which RTP packet. In one embodiment, one UDP packet comprises seven (7) TS packets or cells. In some embodiments, the number of TS packets per UDP packet is different than seven (e.g., depending on network settings). Using the seven TS packet-to-UDP packet example, in a single transport stream, the first seven TS packets go to the first RTP packet, and the next seven TS packets go to the second RTP packet, and so on. By following identifying information such as the continuity counter, an inference may be made as to which TS packet went into which RTP packet.

Considering that RTP sequence numbers are sixteen (16) bits and generally have a random starting value, and further considering the fact that continuity counters are much smaller numbers than RTP sequence numbers, there is not a ready match between the continuity counters and the RTP sequence numbers. To facilitate a correlation between TS and RTP packets (e.g., to uniquely identify the correspondence between TS packets and RTP packets built by the RTP encapsulator 104), other (in lieu of or supplemental to PID and continuity counters) identifying information may be used, such as the PCR available in the transport stream, which may be correlated to the RTP timestamp. In one embodiment, the mapping may be in table data structure format, with each TS packet corresponding to RTP packet identifying information (e.g., timestamp). The table may be distributed as part of the mapping stream, optionally in compressed form, and in some embodiments, multicast to plural RP systems 110. In some embodiments, the mapping information for each RTP packet may also be sent after each packet. Based on the mapping stream including RTP parameters, the RTCP logic 116 of each RP system 110 can build (e.g., derive) RTP packets of an RTP stream and provide correlated (e.g., having a common benchmark) RTCP reports back to the RTCP analysis logic 118 for further processing.

Continuing the description of FIG. 4B, the RP system 110 tunes to the raw-IP video stream, and the accessed data is routed to the RTCP logic 116 and decoding logic of the media engine 306 of the RP system 110. The RTCP logic 116 keeps track of the SPTS or MPTS flows (based on the parameters) as the decoding logic of the media engine 306 decodes the stream. When the RTCP logic 116 in cooperation with the decoding logic of the media engine 306 detects a discontinuity, packet-level repair or retransmission, or a combination of both, may be deployed in similar manner as described above in association with FIG. 4A. RTP stream and RTCP report derivations are similarly implemented as explained above.

Having described certain RQM embodiments where a mapping stream is provided to the RTCP logic 116 from the R/R server 106 or encapsulator 104, description now proceeds with regard to certain embodiments where RTP stream and corresponding RTCP report derivation are implemented without the provision of a mapping stream by an upstream network device. In general, the RTCP logic 116 of plural RP systems 110 in a subscriber television network 110 is configured with encapsulator functionality that receives the source stream (e.g., the non-IP or raw IP broadcast stream) and converts the source stream to a respective RTP stream from which RTCP reports are derived. Each RP system 110 is configured (e.g., via RTCP logic 116) to encapsulate packets in the source stream to packets in an output stream, e.g., an RTP stream, such that the output streams generated and output by plural RP systems 110 for the same source stream (and thus carrying the same video stream) are coordinated.

That is, one or more stream parameters (e.g., fundamental identifying characteristics) for each of the RTP streams is the same across RTP streams output by the other RP systems 110. An example parameter is a packet sequence number for each packet in the output streams. Another example parameter includes timestamps, or in general, a timing reference for packets in the output streams. In some embodiments, other parameters are contemplated. In certain embodiments of RQM systems of the present disclosure, each RP system 110 generates for the same source stream multiple output streams having the same parameters, such as described above. For example, suppose that the following is the input to plural RP systems 110:

... TS_14 ... TS_9 TS_8 TS_7 ... TS_2 TS_1

Note that the numerals following "TS_" and "RTP_" (below) refer to packet numbers. Without loss of generality, seven MPEG2-TS packets may be grouped to create a single RTP packet. Thus, the output stream (e.g., the RTP stream) comprises:

... RTP_2 RTP_1

One goal of the techniques described herein is to have each independent RP system 110 produce RTP packets with identical payloads, sequence numbers and (if possible) timestamps. As a result, RTCP analysis logic (e.g., such as RTCP analysis logic 404 of the R/R server 106) can correlate information found in the RTCP reports.

There are three types of synchronization or coordination considered, though there may be others as well. They are RTP streams with: (a) identical sequence numbers (seqnums), but their timestamps can be different; (b) identical timestamps, but their seqnums can be different; and (c) identical seqnums and timestamps. In each case, the RTP payloads should be identical; otherwise, synchronization is not of much use.

In general, each RP system 110 receives the source stream without any loss and with packets in order. If this is not the case, the RP systems 110 may use some additional methods (e.g., forward error correction, etc.) to recover the missing packets before RTP encapsulation. If the incoming packets of the source stream are out of order, some MPEG-level checking analysis, for example, may be employed by the RTCP logic 116 to put them back in order.

Another approach is that if a missing packet of the source stream cannot be recovered, the corresponding RTP packet in the output stream can be generated with a fewer number of source stream packet(s). This keeps an unsynchronized portion of the source stream to a limited number of packets. Similarly, if a UDP packet which carries seven MPEG2-TS packets is missing, the corresponding RTP packet in the output stream can be skipped all together. That is, there will be a jump in the RTP seqnums, alerting the affected RP system 110 to the data loss.

In one embodiment, communication (e.g., via network 108 or other media) among RP systems 110 occurs to ensure coordination in the building of RTP streams from the source stream. For instance, both timestamps and sequence numbers (e.g., herein, also seqnums) can be generated in a coordinated fashion for multiple output RTP streams.

In one embodiment, communication among the RP systems 110 enables a determination of which RP system 110 is to serve as a "master" with respect to the other RP systems 110 in connection with setting up basic parameters for the encapsulation process to be used. With regard to the master RP system 110, the master RP system 110 generates a preliminary encapsulation and packetization plan for converting the received source stream (e.g., raw or non-IP stream) into an RTP stream. The preliminary encapsulation and packetization plan is a "trial" encapsulation and packetization. The RTCP logic 116 of the master RP system 110 builds RTP packets from the packets in the source stream and a locally-derived mapping stream that describes which packets in the incoming source stream went into building which packets in the output stream.

For example, the locally-derived mapping stream indicates which MPEG2-TS cell (packet identifier (PID), modulo 7 continuity counter and payload unit start indicator) went into which RTP packet. The RTCP logic 116 of the master RP system 110 may concatenate these record streams together and compress them for efficiency.

The RTCP logic 116 of the master RP system 110 sends a message to the other RP systems 110, the message comprising information describing the preliminary encapsulation and packetization plan. This message may be transmitted as an "out-of-band" message and is referred to hereinafter as an "out-of-band mapping stream."

The RTCP logic 116 of the master RP system 110 receives feedback, if any, sent from the RTCP logic 116 of other RP systems 110 as to the preliminary encapsulation and packetization plan and resolves any conflicts or issues raised in the received feedback messages. The RTCP logic 116 of the master RP system 110 continues encapsulating the incoming source packets into RTP packets for the output stream using the finalized encapsulation and packetization plan.

With regard to the RTCP logic 116 of the other RP systems 110, the RTCP logic 116 of the other RP systems 110 receives the preliminary encapsulation and packetization plan from the master RP system 110 and each evaluates the plan and sends feedback, if any, to the master RP system 110 in the form of a feedback message. The RTCP logic 116 of the other RP systems 110 continue encapsulating the packets from the source stream into packets for the RTP outputs stream according to the preliminary (or finalized) encapsulation and packetization plan. The RTCP logic 116 of the other RP systems 110 know the PID and MPEG continuity counter of every cell, and while each receives a complete source stream, each can synchronize the in-band video packet flow with the out-of-band RTP mappings. If one or more of the other RTCP systems 110 determines that it is missing data, it can either "leave a hole" or send a message to the RTCP logic 116 of the master RP system 110 to request the missing data (or use forward error correction or other means to recover the missing data). Similarly, if one of the other RP systems 110 has data that the master RP system 110 does not have, the master RP system 110 may send a message to the other RP systems 110 with instructions to "leave a hole" or request one of the other RP systems 110 to send the missing data to the master RP system 110.

Accordingly, the process described immediately above, at a high level, is a 2-pass encapsulation process in which the master RP system 110 does a preliminary encapsulation of the data, informs its peers about the encapsulation, and resolves any conflicts in the encapsulation. This may be achieved through the master-slave approach described above, or a peer-to-peer approach.

In certain embodiments of an RQM system, communication among RP systems 110 is not implemented to enable coordinated RTP generation. Generally, this approach involves the RTCP logic 116 of each RP system 110 generating one or more stream parameters (e.g., fundamental identifying characteristics) for the output stream (e.g., RTP stream) based on information contained in one or more fields (e.g., in a header) of a packet in the source stream so that the packets in the output stream generated by each of the RP systems 110 from the source stream are coordinated with respect to each other. In particular, using information extracted from one or more header fields of the source stream packets as a seed to a one-to-one mapping function, the RTCP logic 116 generates a unique RTP seqnum for each RTP packet. The information from the one or more header fields may comprise any combination of the fields in the header of the source stream packets, such as MPEG2-TS preamble information. Since each RP system 110 uses the same one-to-one mapping function, each RP system 110 generates the same seqnums from the same header field information in the source stream packets. Thus, the output stream generated by each RP system 110 from the same source stream is coordinated with respect to seqnums. Generally, determining only the initial seqnum is needed. If the initial seqnum is coordinated across the RP systems 110, the subsequent seqnums for subsequent packets can be generated from the initial seqnum in a straightforward manner. At the end, the same sequence numbers are generated for packets in the output streams which carry the same data even if the respective RP systems start generating sequence numbers based on different packets from the source stream.

It is noteworthy that for security reasons, the RFC 3550 standard suggests choosing a random initial seqnum. The seqnum produced by the aforementioned one-to-one mapping function will appear "random" to a hacker. Likewise, the selection of which seven MPEG2-TS packets are grouped together to create an RTP packet is determined by this mapping function.

Continuing, the RTCP logic 116 implements a second one-to-one mapping function (e.g., uses a different one-on-one mapping function than the one used for the seqnums as explained above) based on information in the header fields of the source stream packets to generate timestamps for the RTP packets. For example, the PCR, PTS, and/or DTS information from the header fields of an MPEG2-TS packet may be used to generate an RTP timestamp using the second one-to-one mapping function. Again, similar to seqnums, the initial timestamp is important. Once the initial timestamp is determined, timestamps for subsequent RTP packets may be filled in based on the initial timestamp and a clock rate of the content of the packets in the source stream. Alternatively, the PCR/PTS/DTS information is used as input to the second mapping function to determine the timestamps for the successive packets.

Figure 5:
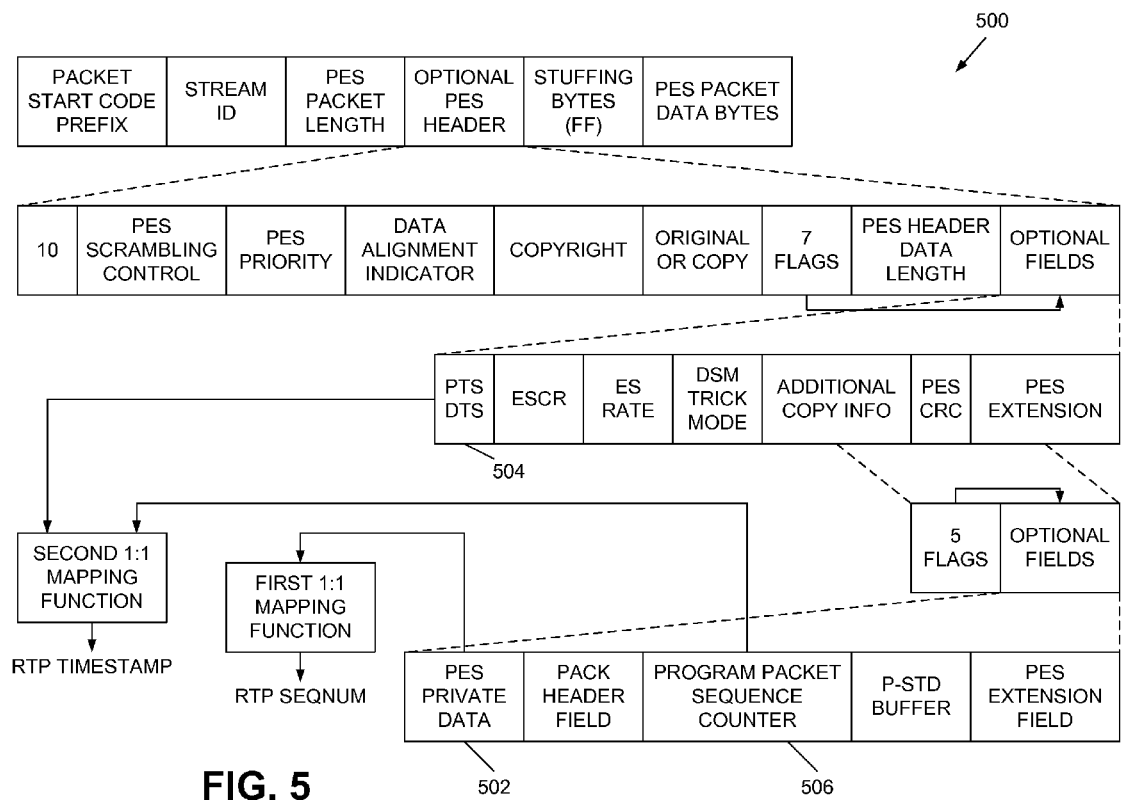
FIG. 5 is a block diagram that illustrates an example of one or more fields of a source stream packet from which information is used to generate parameters for RTP streams for an example RQM system.

Turning to FIG. 5, a block diagram 500 is shown for several header fields of an MPEG2-TS packet. In particular, FIG. 5 shows that the input to the first one-to-one mapping function comprises, for example, a PES private data field 502 that is used to generate the RTP seqnums for RTP packets. FIG. 5 also shows that the input to the second one-to-one mapping function comprises, for example, the PTS and DTS field 504 and/or the PCR field 506, which are used as input to a second one-to-one mapping function to generate the RTP timestamp for an RTP packet. While FIG. 5 shows that different fields of a source stream packet are used to generate the packet sequence number and the timestamp, it should be understood that the same fields may be used to generate both the packet sequence number and the timestamp, albeit with different one-to-one mapping functions as indicated by the first and second one-to-one mapping functions referred to in FIG. 5.

Examples of one-to-one mapping functions are perfect hashing functions that map one or more input values to a unique output value such that the same input value(s) is/are always mapped to the same output values. However, a perfect hashing function is not required. Any mapping function that makes a one-to-one mapping of inputs to outputs is suitable and the function need not also perform a one-to-one mapping of outputs to inputs.

Continuing the discussion with regard to RQM embodiments where communication among the RP systems 110 is not required for coordinated RTP provision, in some embodiments, a third 1:1 (or more) mapping function pertaining to another parameter, such as a stream source identifier (e.g., SSRC number), may be generated by the RTCP logic 116 for the output stream of RTP packets from information in the incoming source stream packets. Accordingly, an RTP packet containing the above-described stream parameters (e.g., seqnum, timestamp, stream source identifier, etc. for that packet or for a prior packet that is part of the same RTP stream) is derived.

Figure 6:
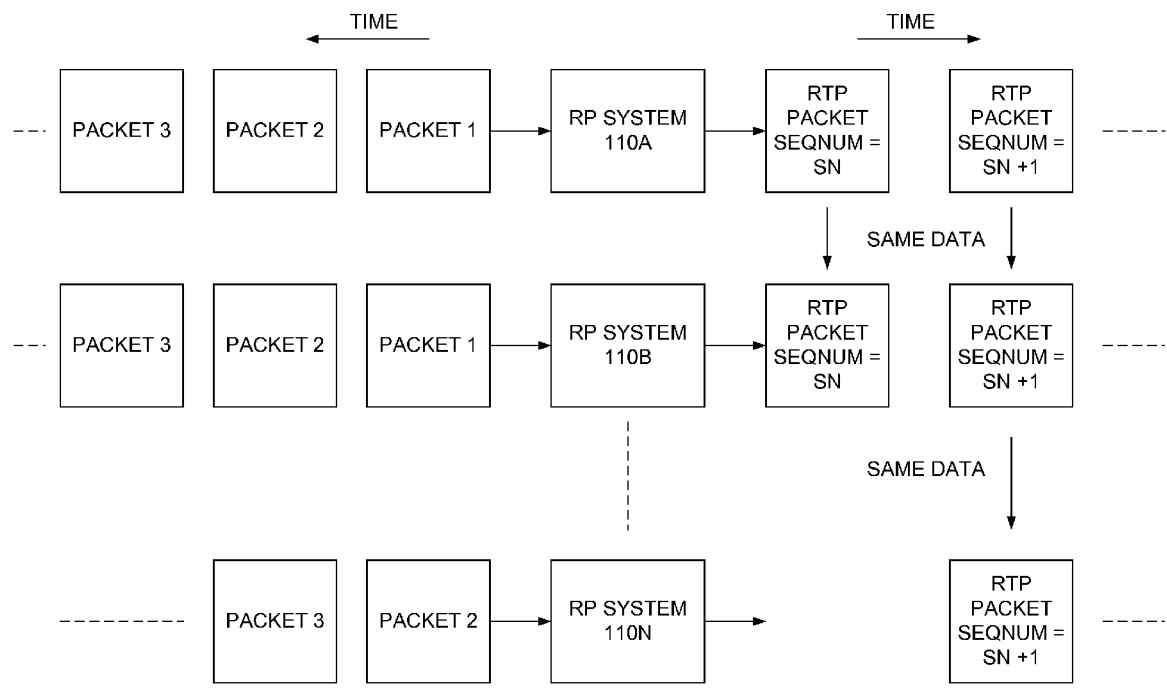
FIG. 6 is a block diagram that illustrates example functionality of an embodiment of a coordinated packet encapsulation process of an example RQM system.

Reference is now made to FIG. 6 to illustrate certain features of the techniques described herein. As should be apparent from the foregoing description, each RP system 110 uses the same packet as a "seed" for the mapping functions to generate the same RTP seqnum and timestamp. Actually, if all the RP systems 110 receive the same first packet, by default they use that packet as the seed and produce identical RTP streams. However, it cannot be guaranteed that all the RP systems 110 will receive the same first packet (due to loss or other reasons, such as where viewers begin watching a particular channel at different times). In other words, one or more RP systems 110 may receive different (first) packets. If the seed is different, the output of the mapping function will be different, though coordination is preserved, as explained below.

For example, as shown in FIG. 6, Packet 1 is the first packet to be received at RP systems 110A and 110B, whereas Packet 2 is the first packet to be received at RP system 110N. Consequently, the first RTP packet output by RP system 110A has a seqnum=SN as does the first RTP packet output by RP system 110B. The next RTP packet output by RP systems 110A and 110B have a seqnum=SN+1. However, the first RTP packet output by RP system 110N has a seqnum=SN+1 because the first packet it received, from which it generated a seqnum, is packet 2 and not Packet 1. Nevertheless, the RTP packets with the same seqnums out of RP systems 110A, 110B, and 110N will carry the same data, which is most important.

Generally, when an RP system 110 uses information from a source stream packet as a seed, it continues to monitor the incoming source stream packets and makes any necessary adjustments in case there is a gap (e.g., loss) of a source stream packet in the sequence of source stream packets. The RP system 110 may use fields of information from new source stream packets to produce the one or more fundamental characteristics. Depending on the content source, encoder settings, etc., the PCR/PTS/DTS values of different source stream packet flows generated by different source video encoders will be different. One or more of the techniques described herein are directed to coordinating the RTP streams produced by different RP systems 110 from the same source stream. In some embodiments, seqnum coordination is more useful in RTP-level monitoring/processing and stream switching as that is more apparent in RTCP reports and RTP-level processing. However, timestamp coordination may also be desired.

The one-to-one mapping functions referred to above converts a bit pattern from one or more fields of source stream packet into a bit pattern representing one or more of the fundamental identifying characteristics (e.g., packet sequence number, timing reference, etc.) in the packets of the output stream. Since each RP system 110 is configured to use the same one-to-one mapping function to generate corresponding fundamental identifying characteristics for the output stream, this ensures that each RP system 110 will generate an output stream having the same fundamental characteristics from the same source stream.

The RTCP logic 116, RTCP analysis logic 118, and the logic of the encapsulator 104 may be implemented in hardware, software, firmware, or a combination thereof. To the extent certain embodiments of the RTCP logic 116, RTCP analysis logic 118, and the logic of the encapsulator 104 or a portion thereof are implemented in software or firmware, executable instructions for performing one or more tasks of the RTCP logic 116, RTCP analysis logic 118, and the logic of the encapsulator 104 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the RTCP logic 116, RTCP analysis logic 118, and the logic of the encapsulator 104 or a portion thereof are implemented in hardware, the RTCP logic 116, RTCP analysis logic 118, and the logic of the encapsulator 104 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 7:
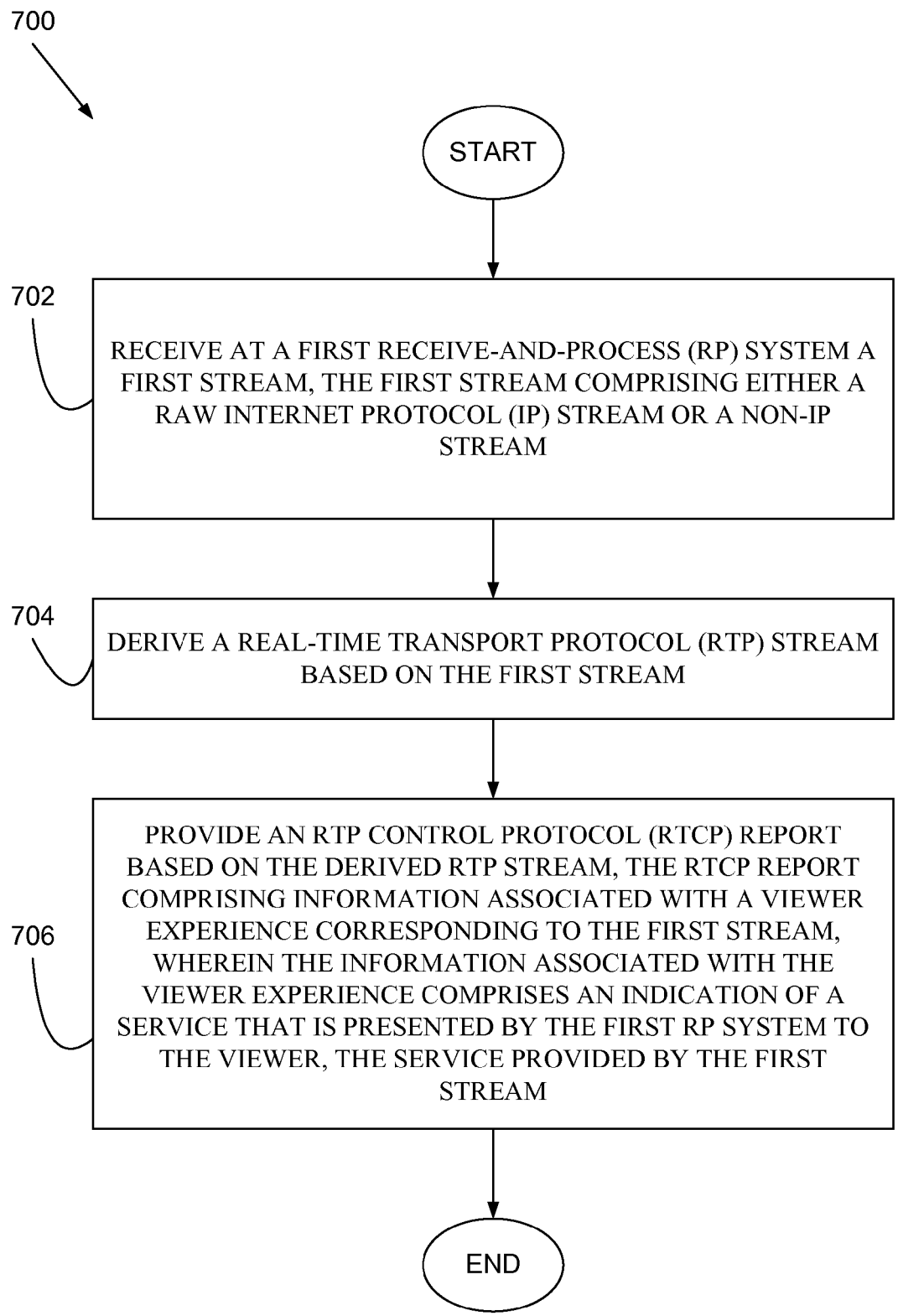
FIG. 7 is a flow diagram that illustrates an RQM method embodiment implemented in an example RP system.

Having described various embodiments of RQM system, it should be appreciated that one method embodiment 700, implemented in one embodiment by an RP system 110 and shown in FIG. 7, comprises receiving at a first receive-and-process (RP) system a first stream, the first stream comprising either a raw Internet protocol (IP) stream or a non-IP stream (702); deriving a Real-time Transport Protocol (RTP) stream based on the first stream (704); and providing an RTP Control Protocol (RTCP) report based on the derived RTP stream, the RTCP report comprising information associated with a viewer experience corresponding to the first stream, wherein the information associated with the viewer experience comprises an indication of a service that is presented by the first RP system to the viewer, the service provided by the first stream (706).

Figure 8:
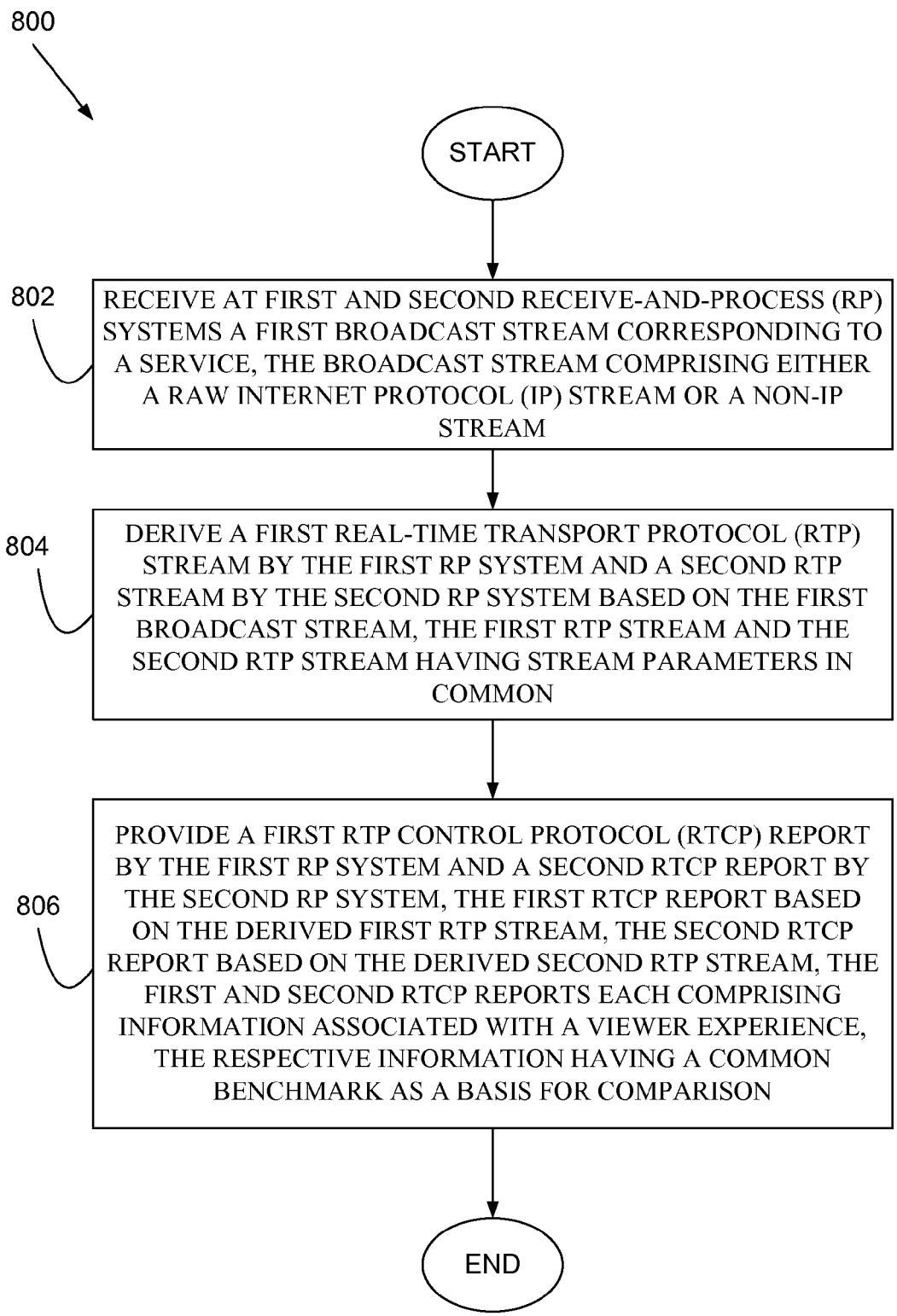
FIG. 8 is a flow diagram that illustrates an RQM method embodiment implemented in plural RP systems.

In view of the above description, another method embodiment 800, implemented by plural RTP systems 110 and shown in FIG. 8, comprises receiving at a first RP system and a second RP system a first broadcast stream corresponding to a service, the broadcast stream comprising either a raw Internet protocol (IP) stream or a non-IP stream (802); derive a first Real-time Transport Protocol (RTP) stream by the first RP system and a second RTP stream by the second RP system based on the first broadcast stream, the first and second RTP streams having stream parameters in common (804); and provide a first RTP Control Protocol (RTCP) report by the first RP system and a second RTCP report by the second RP system, the first RTCP report based on the derived first RTP stream, the second RTCP report based on the derived second RTP stream, the first and second RTCP reports each comprising information associated with a viewer experience, the respective information having a common benchmark as a basis for comparison (806).

Figure 9:
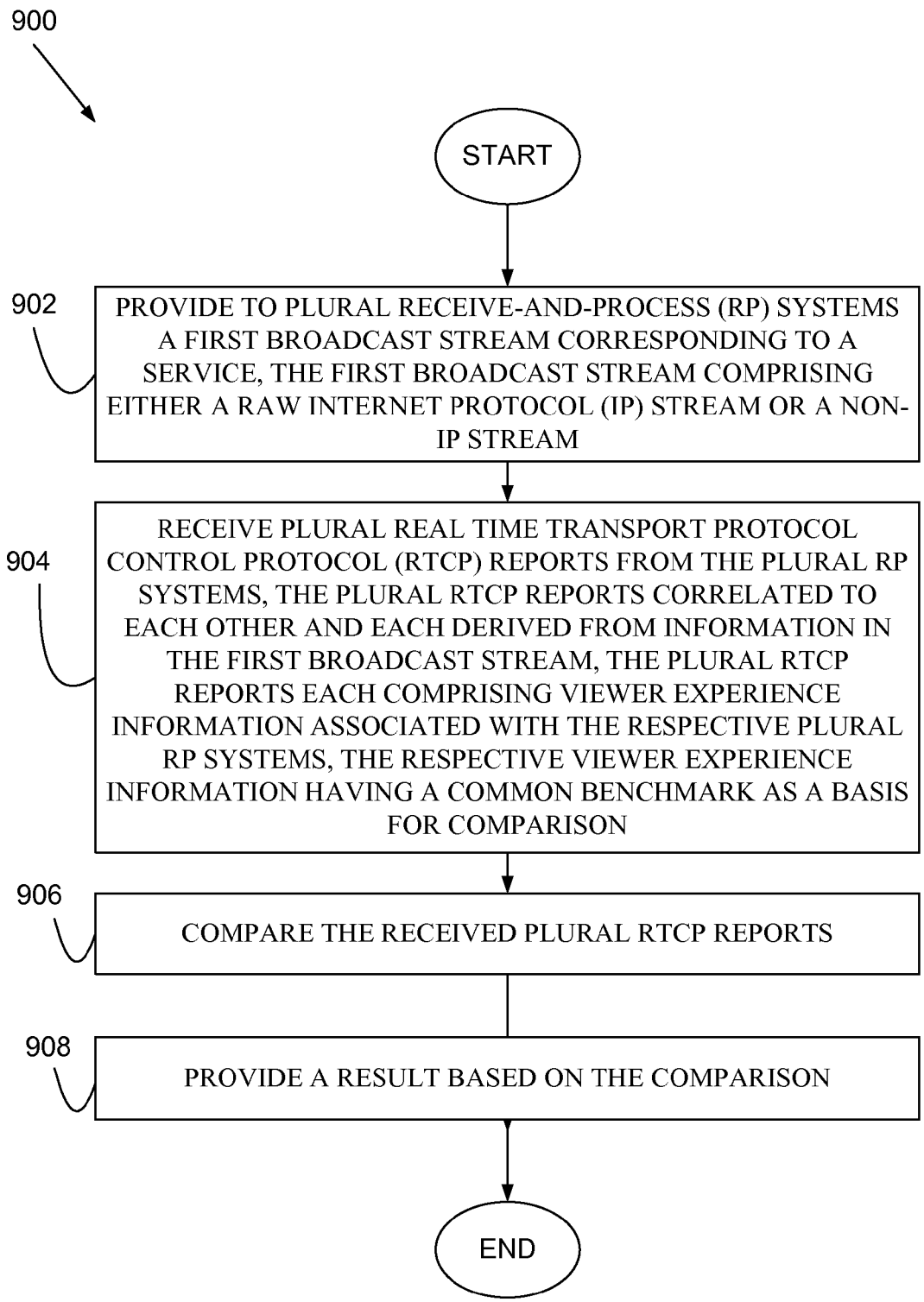
FIG. 9 is a flow diagram that illustrates an RQM method embodiment implemented at an upstream network device.

In view of the above description, another method embodiment 900, implemented by a device (e.g., upstream network device, such as the R/R server 106) and shown in FIG. 9, comprises providing to plural receive-and-process (RP) systems a first broadcast stream corresponding to a service, the first broadcast stream comprising either a raw Internet protocol (IP) stream or a non-IP stream (902); receive plural Real-time Transport Protocol Control Protocol (RTCP) reports from the plural RP systems, the plural RTCP reports correlated to each other and each derived from information in the first broadcast stream, the plural RTCP reports each comprising viewer experience information associated with the respective plural RP systems, the respective viewer experience information having a common benchmark as a basis for comparison (904); compare the received plural RTCP reports (906); and provide a result based on the comparison (908). Such a result may be a rendering (e.g., on a display device, such as to an operator) of the aggregated and/or analyzed ratings and/or quality measurement information or information derived therefrom, or storage of the same for later retrieval. Note that the RTCP reports may be delivered upstream via, for instance, an IP upstream link.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 7-9 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 7-9, either in the beginning, end, and/or as intervening steps.

It should be emphasized that the above-described embodiments of the present disclosure are merely possible examples of implementations, merely set forth for a clear understanding of the principles of the RQM systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method, comprising:
receiving at a plurality of receive-and-process (RP) systems a first stream, the first stream comprising a raw Internet protocol (IP) stream;
deriving a Real-time Transport Protocol (RTP) stream at each RP system based on the first stream and mapping functions based on a seed packet; and
providing an RTP Control Protocol (RTCP) report based on the derived RTP streams, the RTCP report comprising information associated with each viewer experience corresponding to the first stream, wherein the information associated with each viewer experience comprises device generated viewing pattern feedback indicative of whether each viewer deemed a service that is presented by each RP system favorable, based on the time and frequency of usage of the service, the information further including an order of channel changes within the service, wherein the order of channel changes comprises information indicating each channel change to and from the service over a defined period of time, the service provided by the first stream, the RTCP report generated at a master RP system of the plurality of RP systems based on RTCP logic stored on the master RP system.

2. The method of claim 1, wherein deriving the RTP streams comprises:
receiving a mapping stream at the master RP system, the mapping stream comprising an association of an upstream-generated RTP stream and the first stream, wherein the derived RTP stream is based on the mapping stream and the first stream.

3. The method of claim 1, wherein the information associated with each viewer experience further comprises an indication of a quality of service based on reception and processing of the first stream.

4. The method of claim 1, further comprising communicating the RTCP report to an upstream network device.

5. The method of claim 1, wherein deriving further comprises generating the RTP stream based on first stream parameters of the first stream and communicating to a second RP system that receives the first stream a manner of deriving the RTP stream, wherein second stream parameters of the derived RTP stream are communicated to the second RP system, the communication of the manner of deriving the RTP stream enabling correlation of the provided RTCP report with a second RTCP report provided by the second RP system.

6. The method of claim 5, wherein deriving further comprises receiving feedback pertaining to the manner of deriving the RTP stream from the second RP system, the feedback further enabling correlation of the provided RTCP report with the second RTCP report provided by the second RP system.

7. The method of claim 5, wherein the second stream parameters comprise one or more of a timing reference, stream source identifier, or a sequence number.

8. A system, comprising:
a first receive-and-process (RP) system; and
a second RP system, the first RP system and the second RP system each configured to receive a first broadcast stream corresponding to a service, the broadcast stream comprising either a raw Internet protocol (IP) stream or a non-IP stream, the first and second RP systems each further configured to derive a first Real-time Transport Protocol (RTP) stream and a second RTP stream, respectively, based on the first broadcast stream, the first RTP stream and the second RTP stream having stream parameters in common, the first and second RP systems each further configured to provide a first RTP Control Protocol (RTCP) report and a second RTCP report, respectively, the first RTCP report based on the derived first RTP stream, the second RTCP report based on the derived second RTP stream, the first and second RTCP reports each comprising information associated with a viewer experience, the respective information having a common benchmark as a basis for comparison, the first and second RTCP reports each further comprising an indication of respective services that are presented to a viewer and the viewer's viewing patterns with regard to the services, wherein the viewing pattern comprises an order of channel changes by the viewer, wherein the order of channel changes comprises information indicating each channel change to and from the service over a defined period of time.

9. The system of claim 8, wherein the information comprises ratings, wherein the first and second RP systems are further configured to communicate the first and second RTCP reports, respectively, to an upstream network device for analysis of the ratings.

10. The system of claim 9, wherein the information comprises ratings, wherein the ratings include one or more of an indication that the service has been presented by the first RP system and the second RP system to the viewer, absolute channel change history, or relative channel change history.

11. The system of claim 9, wherein the information comprises ratings, wherein the ratings include one or more of an indication of a time and duration of presentation of the service by the viewers associated with the first RP system and the second RP system or other viewing patterns.

12. The system of claim 9, wherein the information associated with the viewer experience comprises an indication of quality of service responsive to receiving and processing by the first and second RP systems the first broadcast stream.

13. The system of claim 8, wherein the stream parameters comprise one or more of a timing reference, stream source identifier, or a sequence number.

14. The system of claim 8, wherein the first and second RP systems are in communication with each other, wherein the deriving occurs based on communication between the first and second RP system.

15. The system of claim 8, wherein the first and second RP systems are not in communication with each other, wherein deriving further comprises the first and second RP systems each receiving the same header information in the first broadcast stream and each generating the stream parameters based on the same header information.

16. A device, comprising:
a communications interface configured to provide to plural receive-and-process (RP) systems a first broadcast stream corresponding to a service, the first broadcast stream comprising either a raw Internet protocol (IP) stream or a non-IP stream; and
processing logic configured to:
receive plural Real-time Transport Protocol (RTP) Control Protocol (RTCP) reports from the plural RP systems, the plural RTCP reports correlated to each other and each derived from information in the first broadcast stream, the plural RTCP reports each comprising viewer experience information associated with the respective plural RP systems, the respective viewer experience information having a common benchmark as a basis for comparison, the viewer experience information further comprising:
an indication of the service that is presented to a viewer,
the viewer's rating of the service, and
the viewer's viewing patterns associated with the service, wherein the viewing patterns comprise an order of channel changes by the viewer, wherein the order of channel changes comprises information indicating each channel change to and from the service over a defined period of time;
compare the received plural RTCP reports; and
provide a result based on the comparison.

17. The device of claim 16, wherein the viewer experience information comprises an indication of whether the service has been presented by one or more of the plural RP systems.

18. The device of claim 16, wherein the viewer experience information comprises an indication of ratings for the plural RP systems that presented the service to the viewers.

19. The device of claim 16, wherein the viewer experience information comprises an indication of quality of service by the plural RP systems that received and processes the first broadcast stream.

20. The device of claim 16, wherein the processing logic is configured to provide the result by providing a popularity rating for the service, a quality measurement for the service, other analytics for the service, or a combination of two or more of these to a display device.

* * * * *